US009203932B2

(12) United States Patent
Bodenhamer et al.

(10) Patent No.: US 9,203,932 B2
(45) Date of Patent: Dec. 1, 2015

(54) OPTIMIZATION GUIDED BY CONNECTION CLASSIFICATION IN A WEB BROWSER EXTENSION

(75) Inventors: Albert Bodenhamer, Mountain View, CA (US); Nikita Kostylev, Moscow (RU)

(73) Assignee: Google Inc., Mountain View, CA (US)

( * ) Notice: Subject to any disclaimer, the term of this patent is extended or adjusted under 35 U.S.C. 154(b) by 340 days.

(21) Appl. No.: 13/876,338

(22) PCT Filed: Sep. 28, 2010

(86) PCT No.: PCT/RU2010/000538
§ 371 (c)(1),
(2), (4) Date: Mar. 27, 2013

(87) PCT Pub. No.: WO2012/044190
PCT Pub. Date: Apr. 5, 2012

(65) Prior Publication Data
US 2013/0191450 A1 Jul. 25, 2013

(51) Int. Cl.
G06F 15/16 (2006.01)
H04L 29/06 (2006.01)
G06F 17/30 (2006.01)
H04L 29/08 (2006.01)

(52) U.S. Cl.
CPC .......... *H04L 67/42* (2013.01); *G06F 17/30899* (2013.01); *H04L 67/02* (2013.01)

(58) Field of Classification Search
None
See application file for complete search history.

(56) References Cited

U.S. PATENT DOCUMENTS

| 7,024,465 | B1 | | 4/2006 | Young et al. |
| 7,617,294 | B1 | * | 11/2009 | Harding ......................... 709/217 |
| 2002/0099818 | A1 | * | 7/2002 | Russell et al. ................. 709/224 |
| 2002/0198961 | A1 | | 12/2002 | Krishnamurthy et al. |
| 2006/0274869 | A1 | | 12/2006 | Morse |
| 2008/0104224 | A1 | * | 5/2008 | Litofsky et al. ............... 709/224 |
| 2010/0161787 | A1 | * | 6/2010 | Jones ............................ 709/224 |
| 2013/0111056 | A1 | * | 5/2013 | Prasad ......................... 709/231 |

OTHER PUBLICATIONS

International Search Report and Written Opinion issued for international application No. PCT/RU2010/000538, mailed on Sep. 14, 2011, 16 pages.

* cited by examiner

*Primary Examiner* — Mohamed Ibrahim
(74) *Attorney, Agent, or Firm* — Harrity & Harrity, LLP

(57) ABSTRACT

A client device requests, from a particular server, a document for presentation in a browser associated with the client device, and receives the document. The client device calculates one or more connection performance values for the document and determines whether the one or more connection performance values are below a threshold value. The client device sends, to another server, a request for another document, for presentation in the browser, where the request for the other document includes an indication of whether the one or more connection performance values are below the threshold value. The client device receives a first version of the other document when the connection performance is below the threshold value and receives a second version of the other document when the connection performance is greater than or equal to the threshold value, where the first version includes less rich content than the second version.

25 Claims, 9 Drawing Sheets

OPTIMIZATION GUIDED BY CONNECTION CLASSIFICATION IN A WEB BROWSER EXTENSION

BACKGROUND

Many companies currently offer web browser extensions. Browser extensions, such as toolbars, may be included to improve the user interface for the web browser and/or other applications. These browser extensions provide functionality that is not available in existing applications. For example, a toolbar for a web browser may permit a user to perform a search right from the toolbar, permit terms to be highlighted on a web page, provide pop-up protection, and do other things to assist the user in finding information of interest. Web browser extensions may also include performance optimizations to improve the user's experience of the web browser.

When a user connects to a website, that website (or web server) knows little about the performance characteristics of the user device to which the server is connecting. Thus, the web server must serve a "one size fits all" web page which may result in long page load times (PLTs) or other delays for users with low quality connections.

SUMMARY

According to one aspect, a method, performed by a client device, may include requesting, by the client device and from a particular server, documents for presentation in a browser associated with the client device; receiving, by the client device and from the particular server, the documents; calculating, by a processor of the client device, one or more connection performance values for the documents; determining, by the processor of the client device, whether the one or more connection performance values are below a threshold value; sending, by the client device and to another server, a request for another document, for presentation in the browser, where the request for the other document includes an indication of whether the one or more connection performance values are below the threshold value; receiving a first version of the other document when the one or more connection performance values are below the threshold value; and receiving a second version of the other document when the one or more connection performance values are greater than or equal to the threshold value, where the first version includes less rich content than the second version.

According to another aspect, a method, performed by one or more server devices, may include receiving, by one of the one or more server devices and from a client, a request for a particular document, where the request includes a connection performance indication for the client; determining, by one of the one or more server devices and in response to the request, if the connection performance indication is sufficient for providing full-featured services; sending, one of the one or more server devices and to the client, the particular document with rich content when the connection performance indication is sufficient for providing full-featured services; and sending, by one of the one or more server devices and to the client, the particular document in an optimized format when the connection performance indication is not sufficient for providing full-featured services, where the optimized format includes less rich content than the particular document with rich content.

According to a further aspect, a computer-readable medium may store computer-executable instructions. The instructions may include an instruction to calculate a page load time (PLT) value for a document provided to a client device; an instruction to determine, based on the determined PLT value, a qualitative connection performance indicator for the client device; and an instruction to send, to a server, a request for another document, where the request includes the qualitative connection performance indicator; an instruction to receive a first version of the other document when the qualitative connection performance indicator corresponds to a first connection quality; and an instruction to receive a second version of the other document when the qualitative connection performance indicator corresponds to a second connection quality, where the first version includes less rich content than the second version.

According to still another aspect, a system having one or more server devices may include a memory, to store instructions, and a processor. The processor may execute instructions in the memory to receive, from a client, a request for a particular document, where the request includes a connection performance indication for the client, determine if the connection performance indication is sufficient for providing full-featured services, send, to the client, the particular document with rich content when the connection performance indication is sufficient for providing full-featured services, and send, to the client, the particular document in an optimized format, including less rich content than the particular document with rich content, when the connection performance indication is not sufficient for providing full-featured services, where the optimized format includes a notification, for presentation to a user of the client, of the optimized format.

According to yet another aspect, a method, performed by a client device, may include requesting, by the client device and from a particular server, a document for presentation in a browser associated with the client device; receiving, by the client device and from the particular server, the document; calculating, by a processor of the client device, one or more connection performance values for the document; determining, by the processor of the client device, whether the one or more connection performance values are below a threshold value; and adjusting, by the processor of the client device, features associated with the browser or a browser extension, associated with the browser, based on the determining whether the one or more connection performance values are below the threshold value.

BRIEF DESCRIPTION OF THE DRAWINGS

The accompanying drawings, which are incorporated in and constitute a part of this specification, illustrate one or more embodiments described herein and, together with the description, explain the these embodiments. In the drawings.

DETAILED DESCRIPTION

Figure 1A:
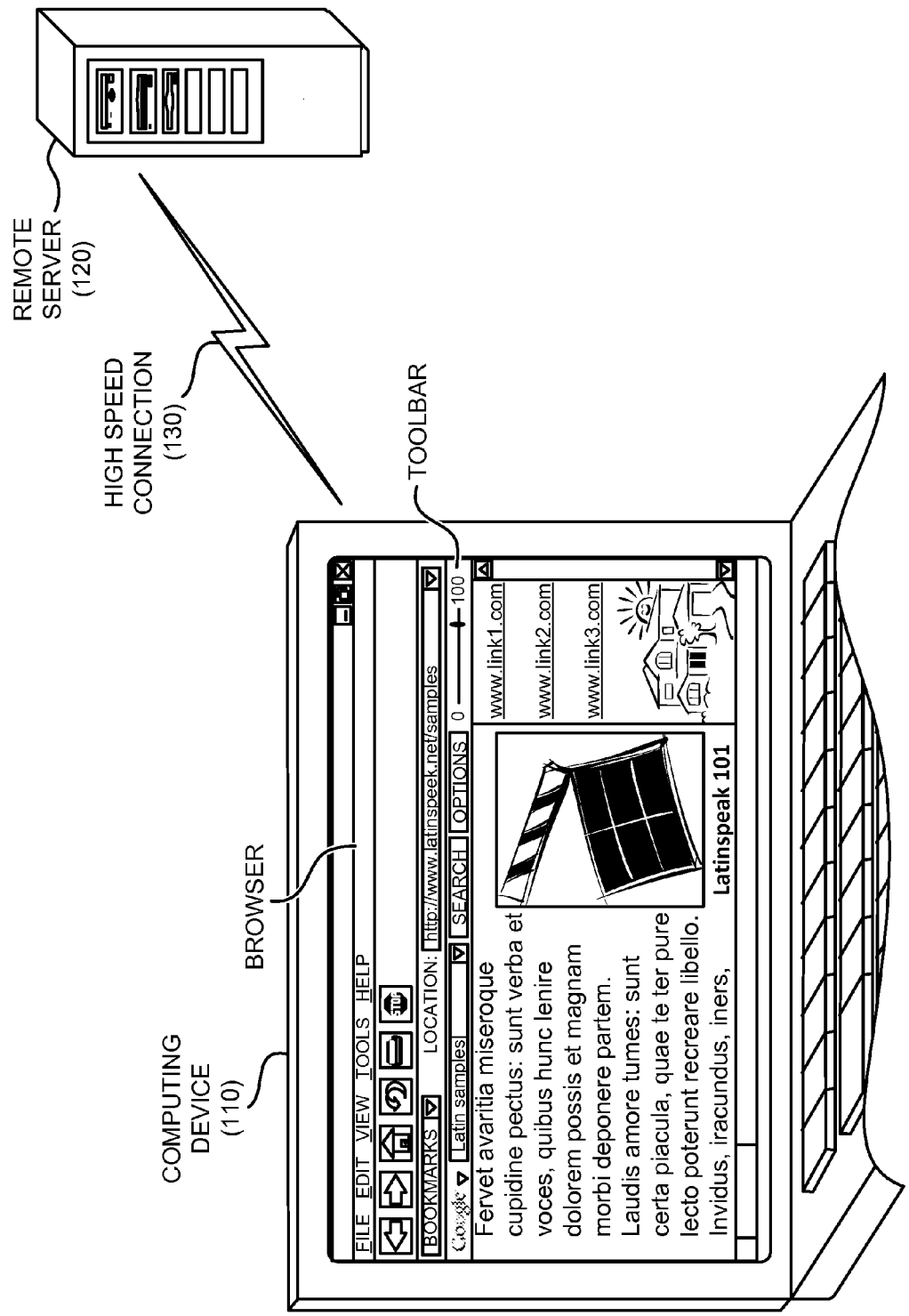
FIGS. 1A and 1B are diagrams illustrating a concept described herein.

The following detailed description refers to the accompanying drawings. The same reference numbers in different drawings may identify the same or similar elements. Also, the following detailed description does not limit the invention.

Overview

Systems and/or methods described herein may implement a browser or browser extension to monitor the performance of a client's network connection. Based on the monitored connection performance, the browser or browser extension may automatically adjust settings of the browser or browser extension to improve performance (e.g., of other features provide by the browser extension). Additionally, or alternatively, systems and/or methods described herein may transmit indications of the monitored connection performance to servers that provide documents (e.g., web pages) to the client.

In one implementation, the browser extension may cause the browser to attach performance information to a document request sent to a server. Based on the performance information in the document request, the server may adjust its content format to best meet the current local connection performance of the client's network connection. For example, the server may provide a high quality document (e.g., in a rich format with bandwidth-intensive content, such as images, video and audio) or a low quality documents (e.g., optimized for less bandwidth consumption) based on the local connection performance of the client's network connection.

A "browser extension" as the term is used herein, may be broadly interpreted to include application software that may be integrated with base application software to enhance the base application software. For example, a browser extension may provide increased specialization or customization for a particular use. A "module," as the term is used herein, may be broadly construed to include a feature of a browser extension. A "base application," as the term is used herein, may be broadly construed to include an application into which an add-on application, such as a browser extension, is integrated or associated.

A "document," as the term is used herein, is to be broadly interpreted to include any machine-readable and machine-storable work product. A document may include, for example, an e-mail, a web page or a web site, a file, a combination of files, one or more files with embedded links to other files, a news group posting, a news article, a blog, a business listing, an electronic version of printed text, a web advertisement, etc. In the context of the Internet (i.e., the web), a common document is a web page. Documents often include textual information and may include embedded information (such as meta information, images, hyperlinks, etc.) and/or embedded instructions (such as Javascript, etc.).

While systems and/or methods are described herein primarily in the context of a web browser with a distinct browser extension, in other implementations, the systems and/or methods may be used with only a web browser (or another application) that implements features of a web browser extension described herein.

Figure 1B:
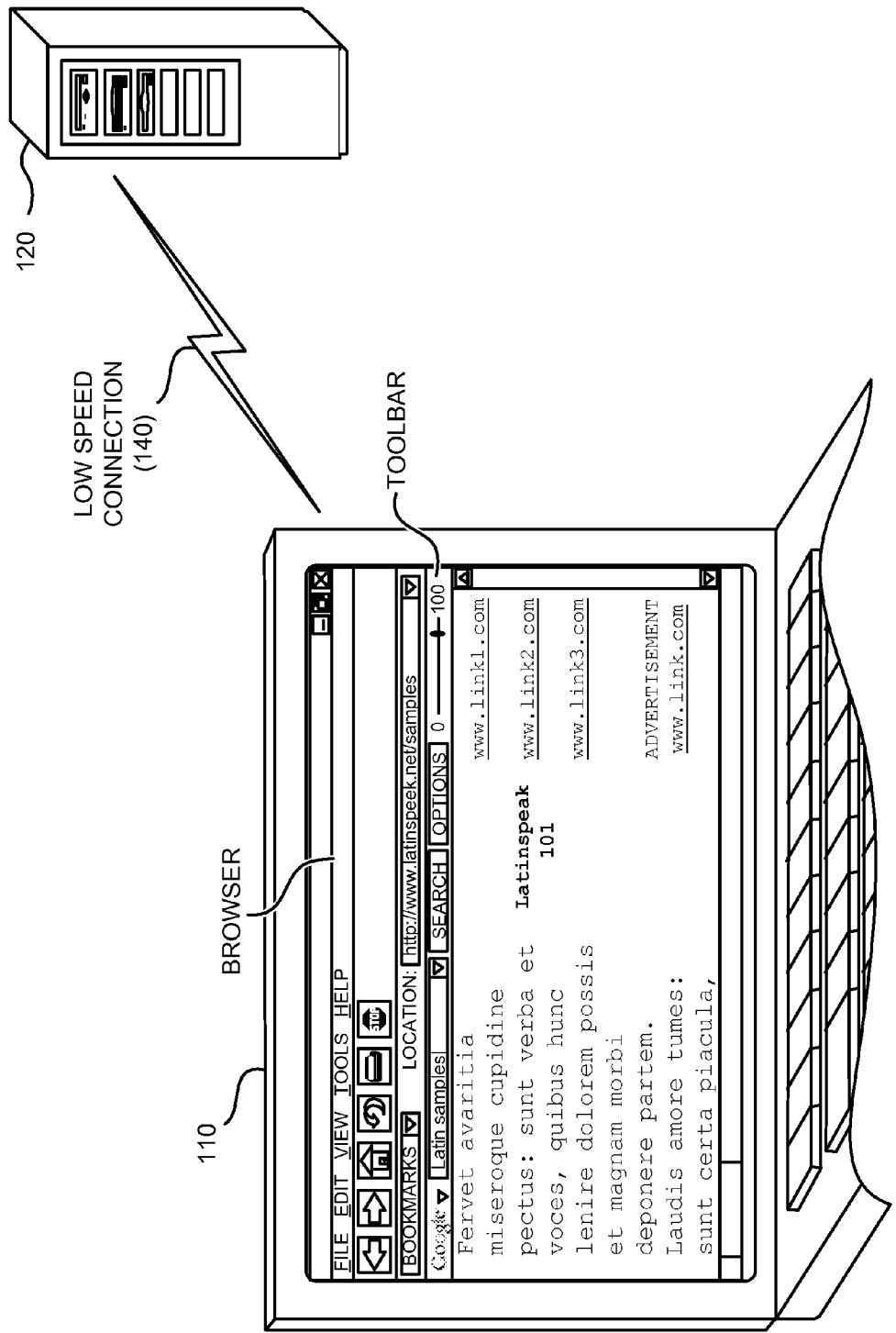

FIGS. 1A and 1B are diagrams illustrating a concept described herein. Referring collectively to FIGS. 1A and 1B, a user might use a computing device 110 to run an application, such as a browser. The browser may include a browser extension, such as a user interface toolbar, that provides additional functionality to a base application, such as the browser. The additional functionality may be provided within the toolbar. For example, the toolbar may include features that allow a user to check spelling within web-page forms, highlight search terms within a web-page, provide a suggestion window for typed search terms, translate text on web pages, rank popularity of search results, etc. Some or all features of the toolbar may depend on sending data to and/or receiving data from a remote server 120. Also, some or all of the features of the toolbar may be logically separated as individual modules that may be selectively enabled/disabled to provide optimal performance for different network connection qualities.

As shown in FIG. 1A, computing device 110 may connect to remote server 120 using a high-speed network connection 130. Generally, high-speed network connection 130 may provide computing device 110 with a high bandwidth connection (e.g., a connection speed greater than a particular threshold) to access remote server 120. High-speed network connection 130 may allow, for example, the toolbar to send data to and/or receive data from remote server 120, in a manner that allows the browser and the toolbar to provide all available features of the toolbar and of any requested document with minimal latency.

Referring to FIG. 1B, computing device 110 may, at a different time and/or location, connect to remote server 120 using a low-speed network connection 140. Generally, low-speed network connection 140 may provide computing device 110 with a lower bandwidth connection (e.g., compared to high-speed network connection 130) to access remote server 120. In contrast with high-speed network connection 130, use of all available features of the browser and the toolbar over low-speed network connection 140 may result in noticeable performance degradation, such as high latency and/or long document load times.

In an implementation described herein, the toolbar may detect low quality connections, such as low-speed network connection 140, and disable particular features of the toolbar to preempt high latency and/or long document load times. Furthermore, the toolbar may provide connection performance information (e.g., along with a document request) to remote server 120 or a different server (not shown). The connection performance information may allow the remote server 120 to adjust the format of the requested document to best match the current connection performance, without, for example, having to first make the user wait to load a document with rich content over a slow connection. As shown in the example of FIGS. 1A and 1B, a web page presented in a rich format in FIG. 1A (e.g., with a high-speed connection) may be provided as a non-rich format (e.g., a text-only format) in FIG. 1B (e.g., with a low-speed connection). Thus, remote server 120 may provide content in a format optimized for the client's current connection performance without first having to first provide a poor user experience to identify a slow connection.

The implementation of the toolbar in the browser, shown in FIGS. 1A and 1B, is an illustrative example. In other implementations, systems and/or methods described herein may be applied to other browser extensions and/or base applications to optimize performance based on a network connection performance. For example, features described herein as attributable to a browser extension may also be integrated into a web browser.

Example Network Configuration

Figure 2:
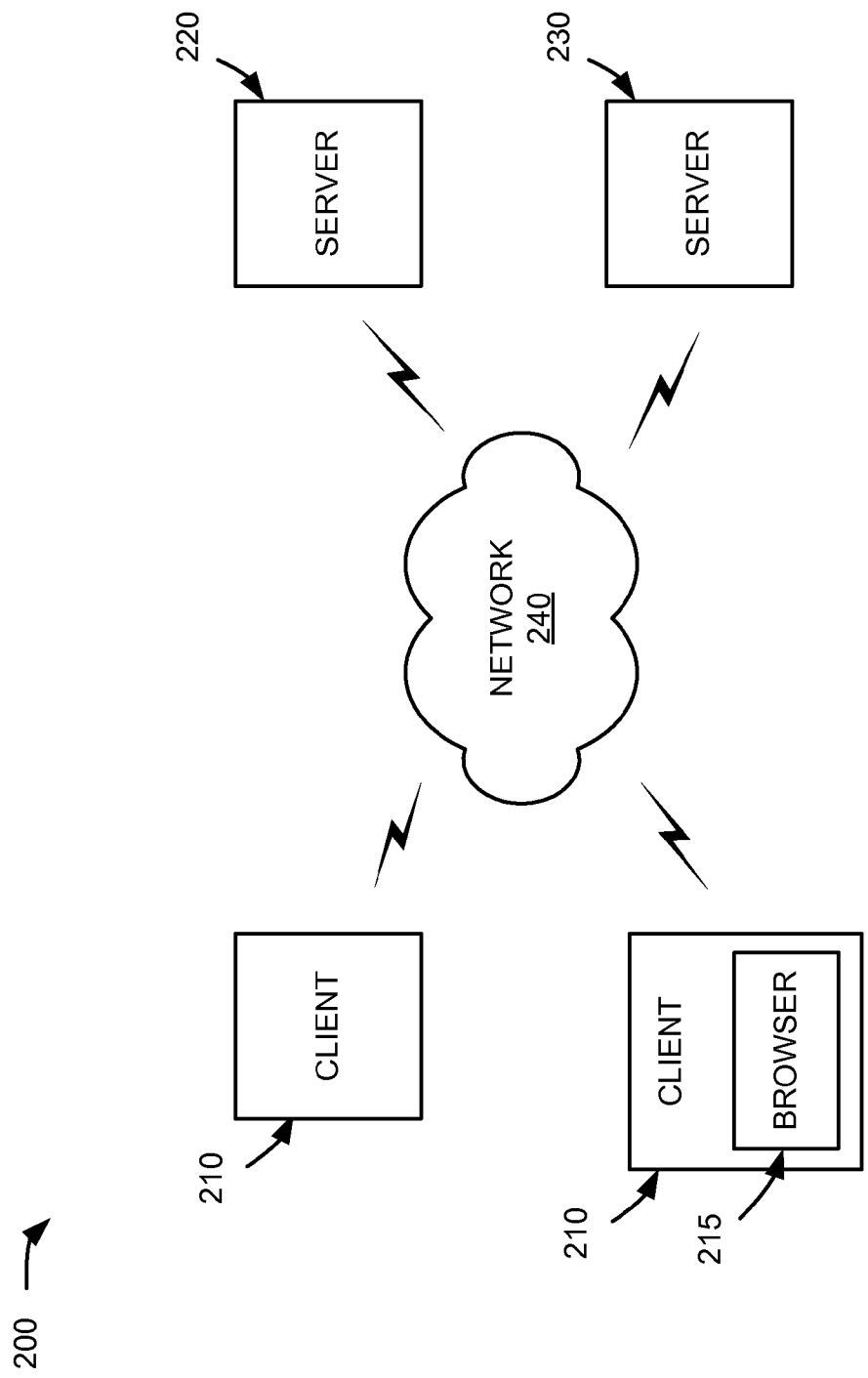
FIG. 2 is a diagram of an example network in which systems and/or methods described herein may be implemented.

FIG. 2 is a diagram of an example network 200 in which systems and/or methods described herein may be implemented. Network 200 may include multiple clients 210 connected to multiple servers 220 and 230 via a network 240. Two clients 210 and two servers 220 and 230 have been illustrated as connected to network 240 for simplicity. In practice, there may be more or fewer clients 210 and servers 220 and 230. Also, in some instances, a client may perform a function of a server or a server may perform a function of a client.

Client 210 may include a client device such as a personal computer (e.g., computing device 110), a wireless telephone, a personal digital assistant (PDA), a lap top, or another type of computation or communication device. In one implementation, a client 210 may include a browser 215. Browser 215 may permit a user to access documents and may provide an interface to servers 220 and 230. Browser 215 may include a browser extension (also referred to herein as a "browser assistant") that may take the form of an add-on toolbar or some other functionality that may operate separate from or in conjunction with browser 215. In other words, browser 215 may perform the functions described below as being performed by the browser assistant. In another implementation, the browser assistant may be integrated as part of browser 215. In some situations, the browser assistant may operate as an interface between browser 215 and network 240.

Servers 220 and 230 may include server devices that gather, process, search, and/or maintain documents. In one implementation, server 220 may receive, respond to, and/or redirect requests, from clients 210, for browser 215 and/or the browser assistant. As described in detail below, server 220 may provide to clients 210 content and/or instructions that may be optimized based on particular connection speeds experienced by clients 210. Server 230 may store or maintain documents that may be accessed by clients 210. Such documents may include data related to news stories, products, images, user groups, geographic areas, or any other type of data. In one implementation, server 220 and server 230 may supply documents with similar content in different formats, based on particular connection speeds reported by clients 210.

While servers 220 and 230 are shown as separate entities, it may be possible for one of server 220 or 230 to perform one or more of the functions of the other one of server 220 or 230. For example, it may be possible for both servers 220 and 230 to be implemented as a single server. It may also be possible for a single one of server 220 or 230 to be implemented as two or more separate (and possibly distributed) devices.

Network 240 may include a local area network (LAN), a wide area network (WAN), a telephone network, such as the Public Switched Telephone Network (PSTN) or a cellular network, an intranet, the Internet, or a combination of networks. Clients 210 and servers 220/230 may connect to network 240 via wired and/or wireless connections.

Although FIG. 2 shows example devices of network 200, in other implementations, network 200 may contain fewer devices, different devices, differently arranged devices, or additional devices than depicted in FIG. 2. Alternatively, or additionally, one or more devices of network 200 may perform one or more other tasks described as being performed by one or more other devices of network 200.

Example Components of Client/Server

Figure 3:
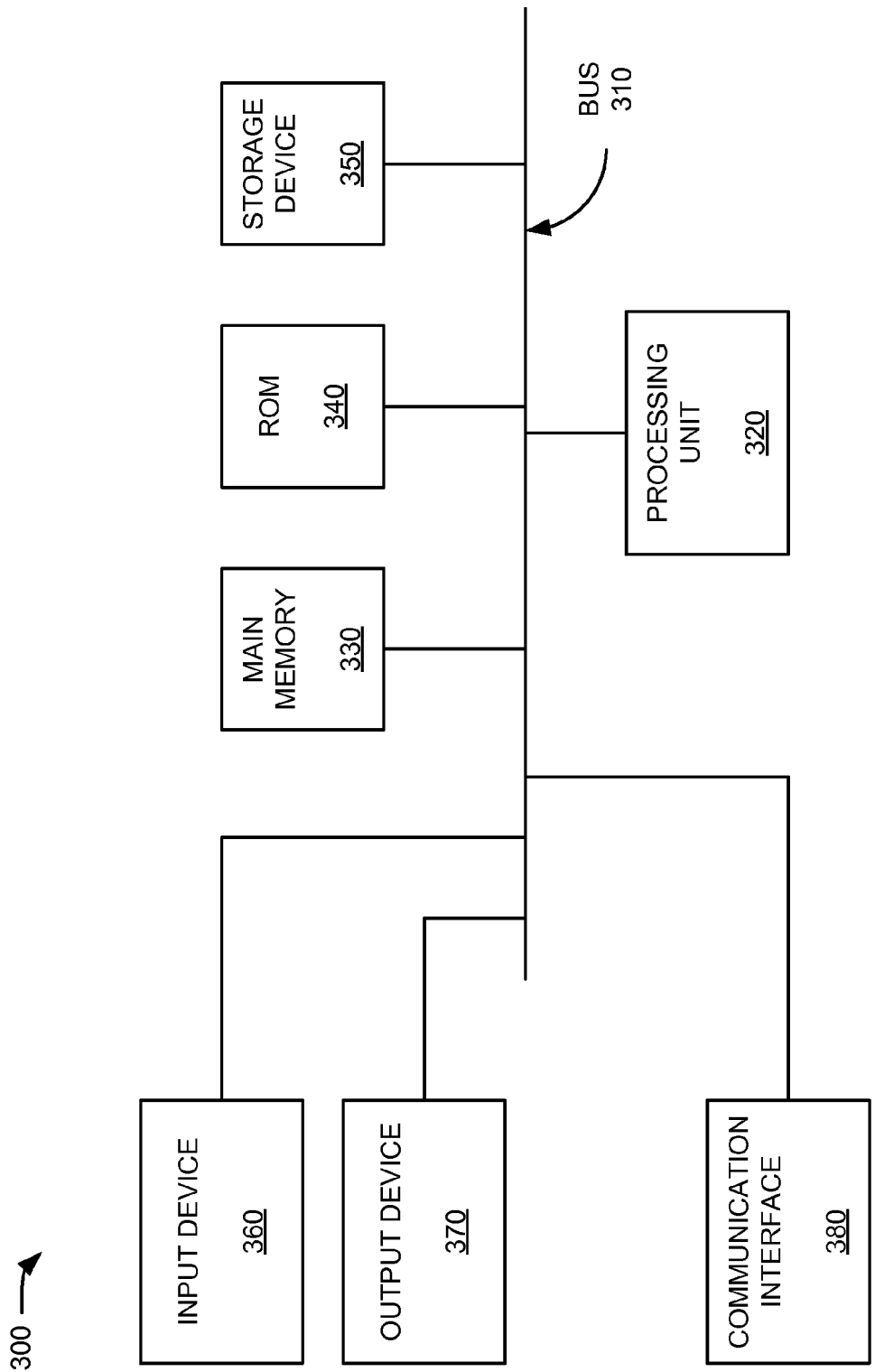
FIG. 3 is a diagram of an example client or server of FIG. 2.

FIG. 3 is a diagram of example components of a device 300 that may correspond to one or more of client 210, server 220, and/or server 230. The device 300 may include a bus 310, a processing unit 320, a main memory 330, a read only memory (ROM) 340, a storage device 350, an input device 360, an output device 370, and a communication interface 380. Bus 310 may include a path that permits communication among the components of device 300.

Processing unit 320 may include a processor, microprocessor, or processing logic that interprets and executes instructions. Main memory 330 may include a random access memory (RAM) or another type of dynamic storage device that stores information and/or instructions for execution by processor 320. ROM 340 may include a ROM device or another type of static storage device that stores static information and instructions for use by processor 320. Storage device 350 may include a magnetic and/or optical recording medium and its corresponding drive.

Input device 360 may include a mechanism that permits an operator to input information to the device 300, such as a keyboard, a mouse, a pen, voice recognition and/or biometric mechanisms, etc. Output device 370 may include a mechanism that outputs information to the operator, including a display, a button, a speaker, etc. Communication interface 380 may include any transceiver-like mechanism that enables device 300 to communicate with other devices and/or systems. For example, communication interface 380 may include mechanisms for communicating with another device or system via a network, such as network 230.

As described herein, device 300 may perform certain operations in response to processing unit 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more other tasks described as being performed by one or more other components of device 300.

Figure 4:
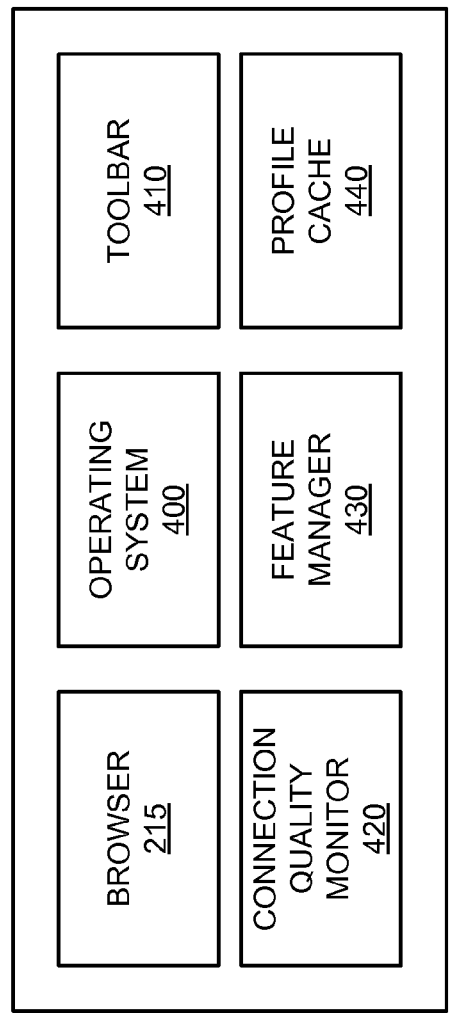
FIG. 4 is a block diagram of example functional components of a client of FIG. 2.

FIG. 4 is a block diagram of example functional components of client 210. The functional blocks illustrated in FIG. 4 may be implemented in hardware or a combination of software and hardware on client 210. For example, the functional components described in connection with FIG. 4 may be implemented by one or more of the components depicted in FIG. 3. While particular functional blocks are shown as being associated with client 210, any of these functional blocks may be implemented in client 210 or a combination of client 210 and server 220/230. As shown in FIG. 4, client 210 may include browser 215, an operating system 400, a toolbar 410, a connection quality monitor 420, a feature manager 430, and a profile cache 440.

Browser 215 may include features described above in connection with, for example, FIG. 2. For example, browser 215 may include software associated with a web browser, such as the Microsoft® Internet Explorer, Google® Chrome, Netscape Navigator, Apple® Safari, or Mozilla® Firefox® browser. Operating system 400 may include operating system software, such as the Windows®, Unix®, Mac™ OS, or Linux® operating systems.

Toolbar 410 may include a browser extension, such as a plug-in, an applet, a dynamic link library (DLL), a bookmark, or a similar executable object or process. Client 210 may obtain the executable object or process from a server, such as one of servers 220 and 230, or from a third party, such as a third party server, disk, tape, network, CD-ROM, etc. Alternatively, the executable object or process may be pre-installed on client 210 (e.g., by a vendor or an original equipment manufacturer (OEM)). Toolbar 410 may be presented as a user interface object within a web browser window (e.g., of browser 215). The user interface object may operate in conjunction with the web browser. In another implementation, toolbar 410 may be part of the web browser. In this latter implementation, the web browser may perform the functions of the user interface object. In yet another implementation, the user interface object may be a process separate from the web browser. For example, the user interface object may interface between the web browser and network 240. Toolbar 410 may be automatically activated upon initiation of the web browser. Alternatively, toolbar 410 may be activated when instructed by a user. In either case, toolbar 410 may take the form of a user interface object, as described above.

Toolbar 410 may include a variety of features to provide increased specialization or customization for particular uses. For example, toolbar 410 may include features that allow a user to check spelling within document forms, highlight search terms within a document, provide a suggestion window for typed search terms, translate text within documents, etc. Some or all features of toolbar 410 may be logically separated as individual modules that may be turned on/off without affecting other features of toolbar 410.

Connection quality monitor 420 may measure connection performance indicators for requested documents (e.g., web pages). Connection performance indicators for a client (e.g., client 210) may include, for example, PLTs, processor speed, available RAM values, a number of cache evictions, etc.

In one implementation, PLTs may be used as indicators of connection performance. For example, short PLTs may be indicative of fast or adequate connection performance, while longer PLTs (e.g., PLTs greater than a particular threshold) for the same document (or all documents generally) may be indicative of slower or inadequate connection performance. PLT measurements may be split into multiple components, such as latency (e.g., domain name system (DNS) latency, TCP/IP connection latency, etc.), bandwidth, page render time, etc. Latency may generally be measured as the time period from when a user selects a link from browser 215 to when the document starts to load. Latency may include subcomponents such as DNS latency (e.g., look-up time), TCP/IP connection latency, etc. A connection could, for example, have poor latency and good bandwidth (e.g., a satellite connection) or good latency and poor bandwidth (e.g., a modem). Thus, in one implementation, connection quality monitor 420 may identify separate components (e.g., latency, bandwidth, etc.) of PLT measurements.

PLTs may be measured from the perspective of client 210 (e.g., based on timestamps obtained from operating system 400). Connection quality monitor 420 may, for example, implement a local stopwatch script to detect start times and end times for latency, page-render times, and/or total load time of requested documents (e.g., web pages). In other implementations, connection quality monitor 420 may obtain connection performance information from another component of client 210, such as another module associated with browser 215.

In another implementation, connection quality monitor 420 may identify PLTs for particular benchmark documents. Benchmark documents may include one or more documents with known preferred (or maximum acceptable) page load times, as defined, for instance, by the document originator. For example, connection quality monitor 420 may store a list of benchmark documents that includes a URL and a threshold PLT associated with each URL. Stored PLTs, from the list of benchmark documents, may be compared against actual PLTs for requested benchmark documents (e.g., web pages) to determine if a current local network connection performance (e.g., between client 210 and server 220/230) provides expected performance.

In one implementation, connection quality monitor 420 may identify connection performance indicators (e.g., PLTs, PLT components, processor speed, available RAM, cache evictions, etc.) for multiple document requests to determine an average connection performance value. The average connection performance value may be calculated, for example, as a moving average (e.g., a weighted or non-weighted average of a particular number of most recent documents) or a periodic average (e.g., an average calculated at certain intervals). The average connection performance value may be compared against stored threshold values to determine if a current network connection quality (e.g., between client 210 and server 220/230) provides expected performance.

In one implementation, connection quality monitor 420 may report connection performance data (e.g., PLT values, processor speed, available RAM, cache evictions, etc) for each document requested by client 210. Additionally, or alternatively, connection quality monitor 420 may collect connection performance data over a particular time period and/or a particular number of downloads (e.g., document downloads) and report an average connection performance value.

In one implementation, connection quality monitor 420 may convert measured connection performance data to qualitative connection performance indicators (e.g., slow/acceptable, low/medium/high, etc.). The qualitative connection performance indicators may, for example, correspond to different optimization levels used by toolbar 410 and/or servers 220/230. Connection quality monitor 420 may apply qualitative connection performance indicators to each measured connection performance indicator and/or to the averaged connection performance values. Qualitative connection performance indicators are described further below in connection with, for example, FIG. 5.

Feature manager 430 may manage the functionality of some or all features of toolbar 410 based on connection performance data and/or qualitative connection performance indicators reported by connection quality monitor 420. Feature manager 430 may also report connection performance data to other devices (e.g., servers 220/230). In one implementation, feature manager 430 may receive local connection performance data (e.g., PLTs and/or qualitative connection performance indicators) from connection quality monitor 420. Based on stored instructions, feature manager 430 may enable/disable particular modules of toolbar 410 depending on the local connection performance data. Feature manager 430 may, for example, disable modules of toolbar 410 that require frequent automated communications between client 210 and servers 220/230. Additionally, or alternatively, feature manager 430 may pause or limit automated communications, from client 210 to servers 220/230, until an indication of a high-speed connection is received. In one example, automatic updates for toolbar 410 may be temporarily suspended until local connection performance has improved. In another example, preloads of anticipated next web pages (e.g., pages a user may visit based on, for example, the current web page and known user tendencies) may be suspended.

Feature manager 430 may send raw connection performance data, averaged connection performance values, and/or qualitative connection performance indicators to servers 220/230. The connection performance data (e.g., the raw connection performance data, averaged connection performance values, and/or qualitative connection performance indicators) may be sent using existing communication mechanisms associated with toolbar 410, such as headers or URL parameters associated with a subsequent document request.

In another implementation, feature manager 430 may make a local determination of whether the connection performance data and/or the qualitative connection speed indicators are indicative of a need for optimization. For example, if feature manager 430 determines that the raw connection performance data or the average connection performance data is not above a particular speed threshold, feature manager 430 may not send an indication to server 220 or server 230 and may simply continue to monitor future connection performance. If feature manager 430 determines that the raw connection performance data or the average connection performance data is below a particular speed threshold (or within a range for a particular qualitative connection performance indicator), feature manager 430 may send an indication to server 220 and/or server 230 that optimization is required for a high latency/low bandwidth connection.

Profile cache 440 may store known settings for location profiles associated with client 210. For example, a user may have multiple wireless location profiles (e.g., for a home, an office, a friend's house, etc.) that tend to have consistent connection performance. In one implementation, feature manager 430 may associate optimization settings with particular location profiles based on previously obtained connection speeds for the particular location profiles. Optimization settings may include, for example, turning on/off features of toolbar 410 to reduce bandwidth usage by browser 215 and/or toolbar 410. Profile cache 440 may also include customized user preferences, such as overrides of particular optimizations (e.g., particular features that a user prefers even when PLT times indicate a low speed connection).

In an implementation described herein, when feature manager 430 provides an indication to server 220/230 that the connection performance for client 210 is not ideal, server 220/230 may respond with optimized content and/or instructions to make best use of limited bandwidth. Browser 215 may receive the optimized content and/or instructions and seamlessly implement the optimized content. Server 220/230 (or a functional component of client 210) may provide a message for presentation to the user explaining the temporary change. Additionally, or alternatively, server 220 may provide instructions to feature manager 430 to disable particular modules of toolbar 410 based on the current connection performance.

Although FIG. 4 shows example functional components of client 210, in other implementations, client 210 may contain fewer functional components, different functional components, differently arranged functional components, or additional functional components than depicted in FIG. 4. Alternatively, or additionally, one or more functional components of client 210 may perform one or more other tasks described as being performed by one or more other functional components of client 210.

Figure 5:
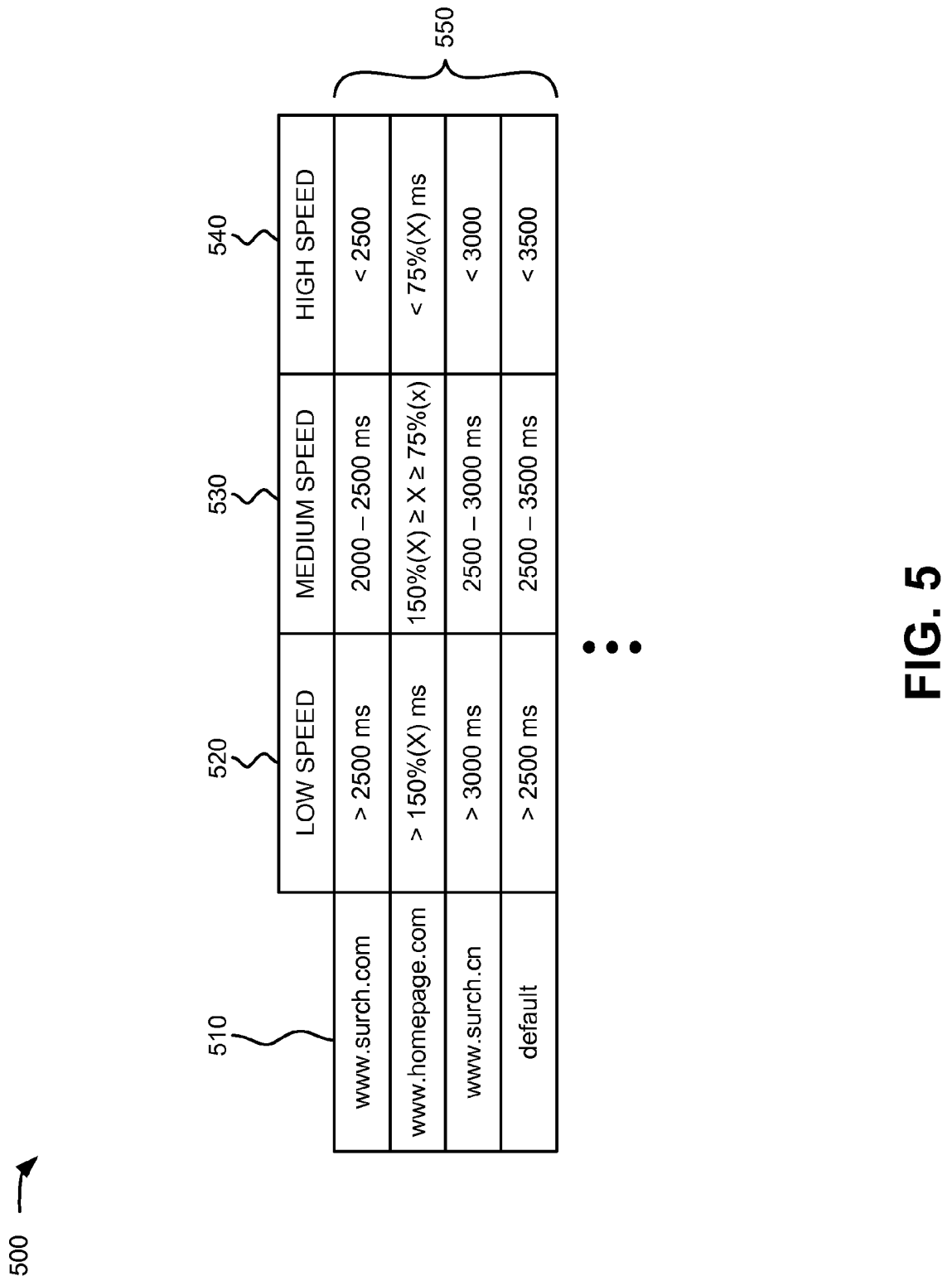
FIG. 5 is a diagram of an example format for a data structure that may be used to classify connection performance.

FIG. 5 provides an example format for a data structure 500 that may be use to classify connection performance. Data structure 500 may be stored, for example, in memory 330 of device 300. As shown in FIG. 5, data structure 500 may include multiple entries 510, with each entry 510 having associated qualitative speed fields (e.g., low speed field 520, medium speed field 530, high speed field 540) and values 550 associated with each speed field.

Each entry 510 may include a document identifier, such as a unique identifier (e.g., a uniform resource locator (URL)) that may be associated with page load times (PLTs). For example, an entry 510 may correspond to a default search engine page (e.g., "www.surch.com", "www.surch.cn"), a home page (e.g., "www.homepage.com"), another document, or any other document not specifically listed (e.g., "default"). Document identifiers to populate entries 510 for a particular client 210 may be extracted, for example, from default search engines, home pages, or other frequently used documents associated with user settings, favorites, and/or a browsing history of browser 215.

Qualitative speed fields (e.g., low speed field 520, typical speed field 530, high speed field 540) may correspond to performance criteria that can trigger one or more level of optimization for use by client 210. For example, high speed field 540 may include PLT values (e.g., measured in milliseconds (ms)), associated with each particular entry 510, that represent a minimum threshold for effective, unrestricted use of full-featured content in browser 215. Medium speed field 530 may include PLT ranges, associated with each particular entry 510, that represent a first level of optimization for browser 215. For example, a first level of optimization may include longer caching periods for documents (e.g., to reduce the frequency of downloads). Low speed field 520 may include PLT values or ranges, associated with each particular entry 510, that represent a second level of optimization for browser 215. For example, a second level of optimization may include serving (from server 220 or server 230) less rich content (e.g., to reduce file size of downloads).

Each of entries 510 may include a different value 550 for each qualitative speed field (e.g., low speed field 520, medium speed field 530, high speed field 540). Thus, for example, a low speed field 520 value corresponding to one entry 510 (e.g., ">2500 ms" for "www.surch.com") may be different than a low speed field 520 value corresponding to another entry 510 (e.g., ">3000 ms" for "www.surch.cn"). Also, values 550 for each speed field may be expressed with discreet numbers (e.g., ">2500 ms") or as percentages of a default value (e.g., "X" for "www.homepage.com"). The value for each qualitative speed field associated with a particular entry 510 may be provided by server 220/230 (e.g., as defined by a network administrator) or may be determined by client 210 based on, for example, a test PLT for a document associated with the particular entry 510.

Although FIG. 5 shows example fields of data structure 500, in other implementations, data structure 500 may contain fewer fields, different fields, or additional fields than depicted in FIG. 5. For example, in another implementation, data structure 500 may include a single speed field to define a threshold below which a single level of optimization may be used. Also, while FIG. 5 is described primarily in the context of PLT values, data structure 500 may also be applied to other forms of connection performance data (e.g., processor speed, available RAM, cache evictions, etc.).

Figure 6:
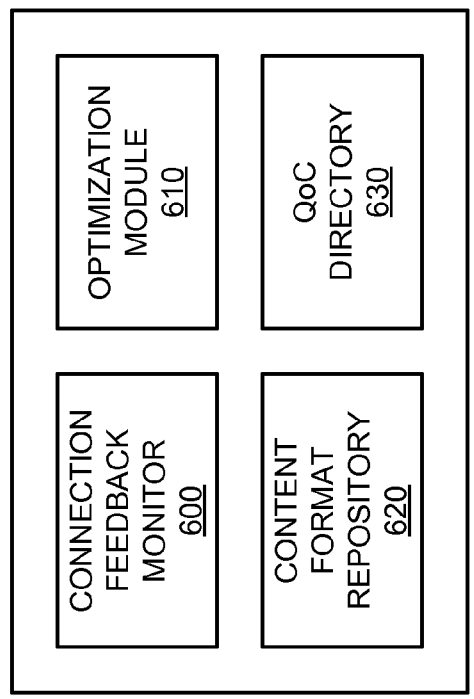
FIG. 6 is a block diagram of example functional components of a server of FIG. 2.

FIG. 6 is a block diagram of example functional components of server 220. The functional blocks, illustrated in FIG. 6, may be implemented in hardware or a combination of software and hardware on server 220. For example, the functional components, described in connection with FIG. 6, may be implemented by one or more of the components depicted in FIG. 3. While particular functional blocks are shown as being associated with server 220, any of these functional blocks may be implemented in server 220 or a combination of servers 220/230. As shown in FIG. 6, server 220 may include a connection feedback monitor (hereinafter "feedback monitor") 600, an optimization module 610, a content format repository 620, and a quality of connection (QoC) directory 630.

Feedback monitor 600 may receive connection performance information from client 210 (e.g., from feature manager 430). In one implementation, feedback monitor 600 may receive a performance indication from client 210 as a quantitative value (e.g., connection performance data, such as a PLT value) associated with a particular document (e.g., a web page). The quantitative value may be, for example, an average value or a most recent PLT value for a particular document. Feedback monitor 600 may receive the PLT data and interpret a qualitative indicator (e.g., low speed, medium speed, high speed, etc.) for client 210 using for example, a data structure similar to data structure 500 described above in connection with FIG. 5. In another implementation, feedback monitor 600 may receive a connection performance indication from client 210 that already includes a qualitative indicator. The connection performance indication may be received from client 210, for example, as part of a hyper text transfer protocol HTTP header or a URL parameter. Feedback monitor 600 may provide the qualitative indicator, associated with client 210, to optimization module 610. In one implementation, connection feedback monitor 600 may also provide the qualitative indicator, associated with client 210, to QoC directory 630.

Optimization module 610 may receive connection performance information from feedback monitor 600 and determine appropriate optimizations. For example, optimization module 610 may receive a qualitative indicator from feedback monitor 600 and identify an appropriate optimization, if necessary. In one implementation, optimization module 610 may have multiple optimization steps associated with multiple quantitative levels of connections. For example, if the connection performance is at an optimal level (e.g., high speed), optimization module 610 may provide full-featured content. If the connection performance is slightly less than an optimal level (e.g., medium speed, rather than high speed), optimization module 610 may increase a cache maximum-age value included in the HTML headers of requested content to reduce subsequent bandwidth usage by client 210. Increasing the cache maximum-age value may allow browser 215 to use on locally stored content and decrease downloads associated with particular documents. However, if the connection performance is significantly less than an optimal level (e.g., low speed, rather than high or medium speed), optimization module 610 may select a less rich version of content for some documents to be download to client 210 and notify the user of client 210 about the change. For example, optimization module 610 may select (e.g., from content repository 620) a text-only content format instead of a content format with images and/or videos. In another implementation, optimization module 610 may identify appropriate optimizations based on comparing actual PLT values for benchmark documents (e.g., received from client 210) to threshold levels associated with the benchmark documents.

Content format repository 620 may include content, templates, high/low bandwidth components, etc., that can be selected (e.g., by optimization module 620) to provide optimal performance for client 210 based on the qualitative indicator received from connection feedback monitor 600.

Quality of connection (QoC) directory 630 may include a database that tracks the speed of connections for particular clients 210 and/or locations. In one implementation, QoC directory 630 may be updated (e.g., by feedback monitor 600) in real time. QoC directory 630 may be made available for applications and services to use to determine a connection performance of a requesting client 210 before providing requested services.

Although FIG. 6 shows example functional components of server 220, in other implementations, server 220 may contain fewer functional components, different functional components, differently arranged functional components, and/or additional functional components than depicted in FIG. 6. Alternatively, or additionally, one or more functional components of server 220 may perform one or more other tasks described as being performed by one or more other functional components of server 220.

Example Processing

Figure 7:
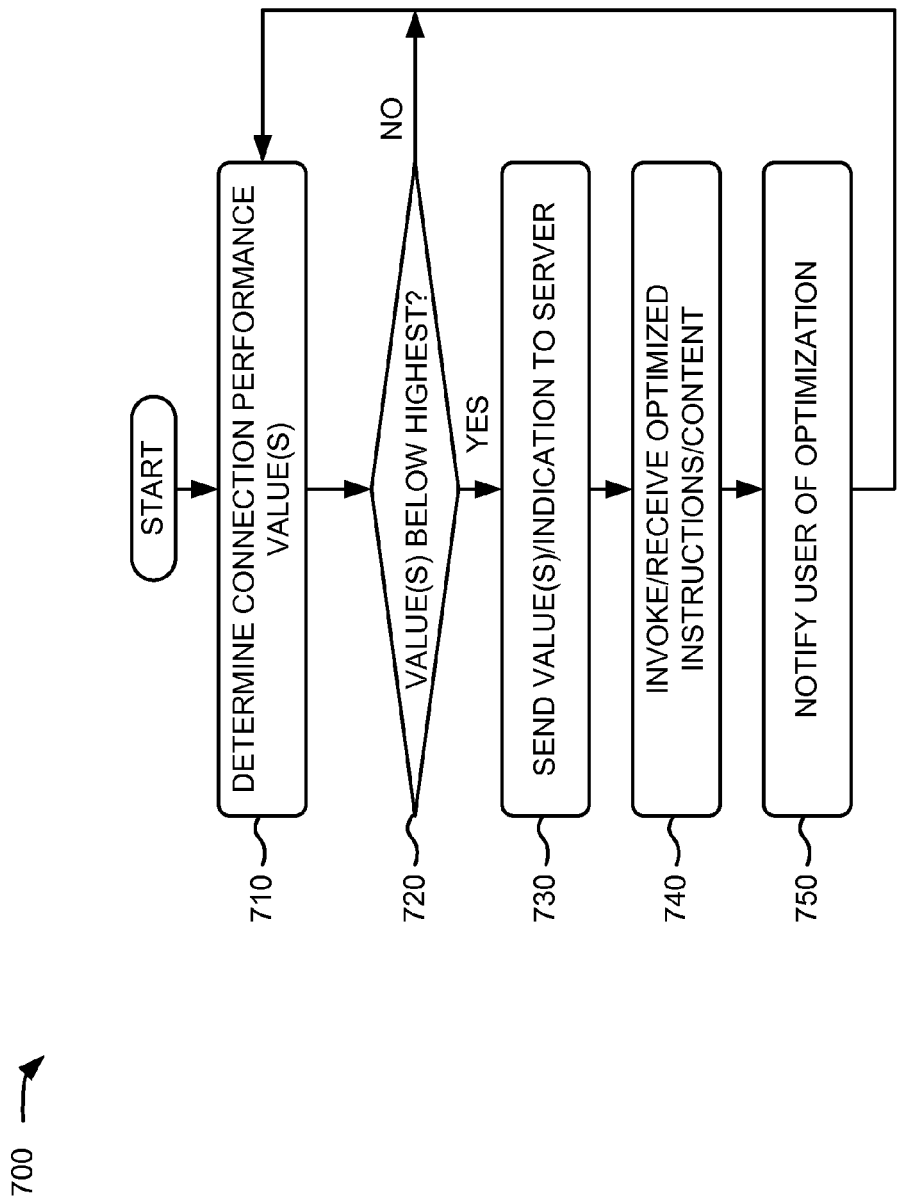
FIG. 7 is a flowchart of an example process for optimizing browser performance based on a connection performance.

FIG. 7 is a flowchart of an example process 700 for optimizing browser performance based on a connection performance. In one implementation, the processing of FIG. 7 may be performed by one or more components within client 210. In another implementation, the processing of FIG. 7 may be performed by one or more components within server 220 in combination with client 210.

Process 700 may include determining one or more connection performance values (block 710). For example, as described above in connection with FIG. 4, connection quality monitor 420 may measure connection performance indicators for requested documents (e.g., web pages). Connection performance indicators for a client (e.g., client 210) may include, for example, PLTs, processor speed, available RAM, cache evictions, etc. In one implementation, PLTs may be used as indicators of connection performance. For example, short PLTs may be indicative of fast or adequate connection performance, while longer PLTs (e.g., PLTs greater than a particular threshold) for the same document may be indicative of slower or inadequate connection performance. PLTs may be measured from the perspective of client 210 (e.g., based on timestamps obtained from operating system 400). Connection quality monitor 420 may, for example, implement a local stopwatch script to detect start times and end times for latency, page-render times, and/or total load time of requested documents (e.g., web pages). In other implementations, connection quality monitor 420 may obtain connection performance information from another component of client 210, such as another module associated with browser 215.

Returning to FIG. 7, process 700 may include identifying whether the determined one or more connection performance values are below a highest value (block 720). If the determined one or more connection performance values are not below a highest value (block 720—NO), process 700 may return to block 710 to determine a next connection performance value. If the determined one or more connection performance values are below a highest value (block 720—YES), the one or more connection performance values and/or an indication of the one or more connection performance values may be sent to a server (block 730). For example, as described above in connection with FIG. 4, feature manager 430 may make a local determination of whether the connection performance data and/or the qualitative connection performance indicators are indicative of a need for optimization.

For example, if feature manager 430 determines that the raw connection performance data or the average connection performance data is below a particular speed threshold, feature manager 430 may not send an indication to server 220 or server 230 and may simply continue to monitor future connection performance. If feature manager 430 determines that the raw connection performance data or the average connection performance data is below a particular speed threshold (or within a range for a particular qualitative connection performance indicator), feature manager 430 may send an indication to server 220 and/or server 230 that optimization is required for a high latency/low bandwidth connection. Feature manager 430 may send raw connection performance data, averaged connection performance values, and/or qualitative connection performance indicators to servers 220/230. The connection performance data may be sent using existing communication mechanisms associated with toolbar 410, such as headers or URL parameters associated with a document request.

Referring back to FIG. 7, process 700 may include invoking and/or receiving optimized instructions and/or content (block 740), and notifying a user of optimization settings (block 750). For example, as described above in connection with FIG. 4, when feature manager 430 provides an indication to server 220/230 that the connection performance for client 210 is not ideal (e.g., below a connection performance threshold or having a low/medium qualitative connection performance indicator), server 220/230 may respond with optimized content and/or instructions to make best use of limited bandwidth. Browser 215 may receive the optimized content and/or instructions and seamlessly implement the optimized content. Server 220/230 (or a functional component of client 210) may provide a message for presentation to the user explaining the temporary change. Additionally, or alternatively, server 220 may provide instructions to feature manager 430 to disable particular modules of toolbar 410 based on the current connection performance.

Figure 8:
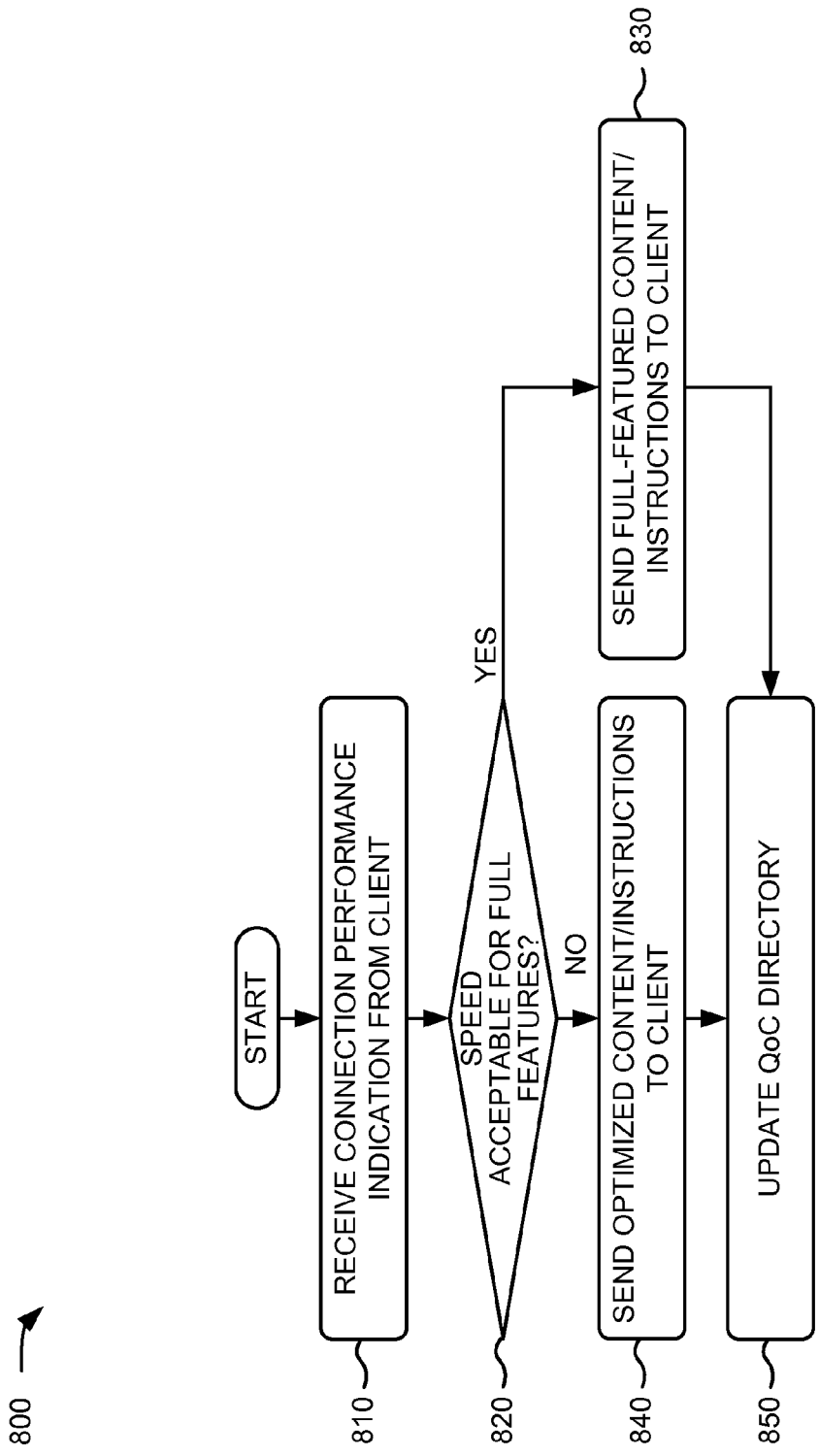
FIG. 8 is a flowchart of an example process for providing optimized browser content based on a connection performance.

FIG. 8 is a flowchart of an example process 800 for providing optimized browser content based on a connection performance. In one implementation, the processing of FIG. 8 may be performed by one or more components within server 220/230. In another implementation, the processing of FIG. 8 may be performed by one or more components within server 220/230 in combination with client 210.

Process 800 may include receiving a connection performance indication from a client (block 810). For example, as described above in connection with FIG. 6, feedback monitor 600 may receive a connection performance information from client 210 (e.g., from feature manager 430). In one implementation, feedback monitor 600 may receive the performance indication from client 210 as a quantitative value (e.g., a PLT value) associated with a particular document (e.g., a web page) and interpret a qualitative indicator (e.g., low speed, medium speed, high speed, etc.). In another implementation, feedback monitor 600 may receive a connection performance indication from client 210 that already includes a qualitative indicator.

Returning to FIG. 8, process 800 may include determining if the connection performance is acceptable for full features (block 820). If the connection performance is acceptable for full features (block 820—YES), full-featured content/instructions may be sent to the client (block 830). If the connection performance is not acceptable for full features (block 820—NO), optimized content/instructions may be sent to the client (block 840). For example, as described above in connection with FIG. 6, optimization module 610 may receive a qualitative indicator from feedback monitor 600 and identify an appropriate optimization, if necessary. In one implementation, optimization module 610 may have multiple optimization steps associated with multiple quantitative levels of connections. For example, if the connection performance indication is at an optimal level (e.g., high speed), optimization module 610 may provide full-featured (e.g., rich) content. If the connection performance indication is slightly less than an optimal level (e.g., medium speed, rather than high speed), optimization module 610 may extend a cache maximum-age value included in the HTML headers of requested content to reduce subsequent bandwidth usage by client 210. However, if the connection performance indication is significantly less than an optimal level (e.g., low speed, rather than high or medium speed), optimization module 610 may select a less rich version of content for some documents to be download to client 210 and notify the user of client 210 about the change. For example, optimization module 610 may select (e.g., from content repository 620) a text-only content format instead of a content format with images and/or videos.

Returning to FIG. 8, a QoC directory may be updated (block 850). For example, as described above in connection with FIG. 6, QoC directory 630 may be updated (e.g., by feedback monitor 600) in real time. QoC directory 630 may be made available for applications and services to use to determine a connection performance of a requesting client 210 before providing requested services.

CONCLUSION

Systems and/or methods described herein may implement a browser extension to monitor the performance of a client's network connection. Based on the monitored connection performance, the browser extension may adjust settings of the browser extension to improve performance and/or transmit an indication of the monitored connection performance to servers that provide documents to the client. In one implementation, a client may request and receive, from a server, a document for presentation in the browser associated with the browser extension. The client may calculate one or more connection performance values for the document and may determine that the one or more connection performance values are below a minimum threshold value. The client may send, to a different server, a request for another document, different from the originally-requested document. The request for the other document may include an indication that the one or more connection performance values are below the minimum threshold value, so that the other server may supply the other document in a format best suited for the current network connection performance, as indicated by the connection performance value.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 7 and 8, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system having one or more server devices, the system comprising:
a memory to store a plurality of instructions; and
a processor to execute instructions in the memory to:
receive, from a client, a request for a particular document, where the request includes a connection performance indication for the client,
the connection performance indication including one or more of:
a page load time (PLT) value of the particular document for the client;
an average PLT value of the particular document for the client; or
a qualitative indicator of the connection performance based on a PLT value for the client;
determine if the connection performance indication is sufficient for providing full-featured services based on comparing the connection performance indication to a group of defined speeds associated with the particular document,
send, to the client, the particular document with rich content when the connection performance indication is sufficient for providing full-featured services, and
send, to the client, the particular document in an optimized format, including less rich content than the particular document with rich content, when the connection performance indication is not sufficient for providing full-featured services, where the optimized format includes a notification, for presentation to a user of the client, of the optimized format.

2. The system of claim 1, where, when determining if the connection performance indication is sufficient for providing full-featured services, the processor is configured to:
identify the PLT value and a benchmark document identifier from the connection performance indication,
compare the PLT value to the group of defined speeds for the benchmark document identifier to determine a qualitative connection performance.

3. The system of claim 2, where the determined qualitative connection performance may correspond to one of multiple levels of optimized formats.

4. The system of claim 1, where the connection performance indication is included within one of a hyper text transfer protocol (HTTP) header or uniform resource locator (URL) parameter included in the request.

5. A method performed by a client device, comprising:
requesting, by the client device and from a particular server, a document for presentation in a browser associated with the client device;
receiving, by the client device and from the particular server, the document;
calculating, by a processor of the client device, one or more connection performance values for the document,
the one or more connection performance values including one or more of:
a page load time (PLT) value of the document for the client device;
an average PLT value of the document for the client device; or
a qualitative indicator of a connection performance based on a PLT value for the client device;
determining, by the processor of the client device, whether the one or more connection performance values are below a threshold value;
sending, by the client device and to another server, a request for another document, for presentation in the browser, where the request for the other document includes an indication of the one or more connection performance values when the one or more connection performance values are below the threshold value;
receiving a first version of the other document when the one or more connection performance values are below the threshold value,
the first version of the other document being determined based on comparing the one or more connection performance values to a group of defined speeds associated with the other document; and
receiving a second version of the other document when the one or more connection performance values are greater than or equal to the threshold value, where the first version includes less rich content than the second version.

6. The method of claim 5, where the other document includes instructions for the browser based on the indication of whether the one or more connection performance values are below the threshold value.

7. The method of claim 5, further comprising:
sending, by the client device and to the particular server, an indication that the one or more connection performance values are below the threshold value.

8. The method of claim 5, further comprising:
adjusting, by the processor of the client device, features associated with the browser or a browser extension, associated with the browser, based on the determining whether the one or more connection performance values are below the threshold value.

9. The method of claim 5, where calculating the one or more connection performance values for the document includes:
averaging the one or more connection performance values for the document with one or more other connection performance values for other documents.

10. The method of claim 5, where determining whether the one or more connection performance values are below the threshold value includes:
comparing the one or more connection performance values to a stored value.

11. The method of claim 5, where the indication is inserted in one or more of:
   a hyper text transfer protocol (HTTP) header of a message sent from the client device to the other server, or
   a uniform resource locator (URL) parameter for the other document sent from the client device to the other server.

12. The method of claim 5, where determining whether the one or more connection performance values are below the threshold value includes:
   identifying one of multiple quantitative levels of connection performance, below the threshold value, associated with the one or more connection performance values.

13. The method of claim 5, where the one or more connection performance values for the document include more than one connection performance value, the more than one connection performance value including at least one of:
   a domain name server (DNS) lookup time,
   a connection latency value,
   a processor speed,
   an available RAM value, or
   a cache eviction value.

14. The method of claim 5, where sending the request for the other document comprises:
   causing, by a browser extension included in the client device, the browser to attach the indication of the one or more connection performance values to the request for the other document.

15. A method performed by one or more server devices, comprising:
   receiving, by one of the one or more server devices and from a client, a request for a particular document, where the request includes a connection performance indication for the client,
   the connection performance indication including one or more of:
      a page load time (PLT) value of the particular document for the client;
      an average PLT value of the particular document for the client; or
      a qualitative indicator of the connection performance based on a PLT value for the client;
   determining, by one of the one or more server devices and in response to the request, if the connection performance indication is sufficient for providing full-featured services based on comparing the connection performance indication to a group of defined speeds associated with the particular document;
   sending, by one of the one or more server devices and to the client, the particular document with rich content when the connection performance indication is sufficient for providing full-featured services; and
   sending, by one of the one or more server devices and to the client, the particular document in an optimized format when the connection performance indication is not sufficient for providing full-featured services, where the optimized format includes less rich content than the particular document with rich content.

16. The method of claim 15, where the connection performance indication is included within one of a hyper text transfer protocol (HTTP) header or uniform resource locator (URL) parameter included in the request.

17. The method of claim 15, further comprising;
   storing, in a memory associated with one of the one or more servers, the connection performance indication for the client; and
   sending, to the client, a subsequent document in an optimized format based on the stored connection performance indication.

18. The method of claim 15, where determining if the connection performance indication is sufficient for providing full-featured services comprises:
   associating the page load time (PLT) value with a particular document identifier,
   comparing the PLT value to the group of defined speeds to determine a qualitative indicator, and
   identifying an optimization setting associated with the determined qualitative indicator.

19. A non-transitory computer-readable medium for storing instructions, the instructions comprising:
   a plurality of instructions which, when executed by one or more processors associated with a client device, cause the one or more processors to:
      calculate a page load time (PLT) value for a document provided to the client device;
      determine, based on the PLT value, a qualitative connection performance indicator for the client device;
      send, to a server, a request for another document, where the request includes an indication of the qualitative connection performance indicator;
      receive a first version of the other document when the qualitative connection performance indicator corresponds to a first connection quality,
         the first version of the other document being determined based on comparing the qualitative connection performance indicator to a group of defined speeds associated with the other document; and
      receive a second version of the other document when the qualitative connection performance indicator corresponds to a second connection quality, where the first version includes less rich content than the second version.

20. The non-transitory computer-readable medium of claim 19, where the plurality of instructions further cause the one or more processors to:
   adjust features associated with a browser or a browser extension, associated with the browser, based on the qualitative connection performance indicator.

21. The non-transitory computer-readable medium of claim 19, where the plurality of instructions, when calculating the PLT value, cause the one or more processors to:
   determine a particular PLT value associated with a last request for the document, or
   determine an average PLT value associated with multiple requests for the document.

22. The non-transitory computer-readable medium of claim 19, where the document is one of:
   a browser home page, or
   a default search engine page.

23. A method performed by a client device, comprising:
   requesting, by the client device and from a particular server, a document for presentation in a browser associated with the client device;
   receiving, by the client device and from the particular server, the document;
   calculating, by a processor of the client device, one or more connection performance values for the document,
      the one or more connection performance values including one or more of:
         a page load time (PLT) value of the document for the client device;
         an average PLT value of the document for the client device; or a qualitative indicator of a connection performance based on a PLT value for the client device;

determining, by the processor of the client device, whether the one or more connection performance values are below a threshold value; and adjusting, by the processor of the client device, features associated with the browser or a browser extension, associated with the browser, based on the determining whether the one or more connection performance values are below the threshold value.

24. The method of claim 23, where adjusting the features associated with the browser or the browser extension include one or more of:

limiting automated communications, from the client device to the particular server, when the one or more connection performance values are below a threshold value, or disabling one or more modules of the browser or the browser extension, when the one or more connection performance values are below a threshold value.

25. The method of claim 23, where calculating the connection performance value for the document includes:

averaging the connection performance value for the document with one or more other connection performance values for other documents.

* * * * *